United States Patent [19]

Kitai et al.

[11] 4,231,648
[45] Nov. 4, 1980

[54] AUTOMATIC FOCUSING CAMERA

[75] Inventors: Kiyoshi Kitai; Tadashi Nakagawa; Hiroaki Ishida, all of Yotsukaido, Japan

[73] Assignee: Seiko Koki Kabushiki Kaisha, Tokyo, Japan

[21] Appl. No.: 8,762

[22] Filed: Feb. 1, 1979

[30] Foreign Application Priority Data

Feb. 7, 1978 [JP] Japan ................................ 53-12701

[51] Int. Cl.³ .............................................. G03B 3/10
[52] U.S. Cl. ...................................... 354/195; 354/25
[58] Field of Search ................. 354/25, 163, 168, 169, 354/195, 266; 250/201, 204; 356/1, 4

[56] References Cited

U.S. PATENT DOCUMENTS

| | | | |
|---|---|---|---|
| 3,442,193 | 5/1969 | Pagel | 354/25 |
| 3,529,528 | 9/1970 | Leitz | 354/163 X |
| 4,075,639 | 2/1978 | Peterson | 354/25 |
| 4,103,152 | 7/1978 | Stauffer | 356/4 |
| 4,160,587 | 7/1979 | Heiniger et al. | 354/25 |

*Primary Examiner*—Donald A. Griffin
*Assistant Examiner*—William B. Perkey
*Attorney, Agent, or Firm*—Robert E. Burns; Emmanuel J. Lobato; Bruce L. Adams

[57] ABSTRACT

An automatic focusing apparatus for use in a camera has an operating member which moves from a rest position to a depressed position. An actuating member is rotatably mounted on the operating member and a detecting member is mounted for movement from a first position to a second position and is biased normally into the first position. The actuating member enables the detecting member to move from the first to the second position in response to the movement of the operating member from the rest position to the depressed position and disengages from the detecting member when the operating member is in the depressed position to enable the detecting member to move from the second position to the first position under the action of its bias. A device produces an electric signal corresponding to the position of the detecting member and a focus scanning member is movable over its entire focus scanning range in response to the movement of the detecting member between its first and second positions. An electro-magnet is provided for stopping the movement of the detecting member during its movement from the second to the first position when the electro-magnet is actuated. A focus detecting module receives a signal from the device synchronously with the movement of the focus scanning member during the movement of the detecting member to the second position to determine the signal from the device corresponding to the in-focus position and for actuating the electro-magnet to stop the return movement of the detecting member to its first position when the signal from the device is equal to that determined for the in-focus position. In this way, the camera lens can be focused with reduced error.

4 Claims, 3 Drawing Figures

AUTOMATIC FOCUSING CAMERA

BACKGROUND OF THE INVENTION

This invention relates to an automatic focusing camera. A camera capable of the automatic focusing of the photographic lens, by operation of an electromagnet controlled by an electric signal produced through the detection of the object distance, facilitates photographic work.

Generally, the construction of a camera having a focusing system controlled by an electric signal is inevitably more complicated due to the effect of additional factors, for instance, brightness of the object, when compared with the conventional camera equipped with a coupled range finder with which a photographer adjusts the in-focus position of the photographic lens by observing the coincidence of the double images displayed within the view finder.

In order to detect the in-focus position while taking the effect of those additional factors into consideration, a method is introduced to stop the photographic lens at the in-focus position by means of an electric signal corresponding to the in-focus position during repetition of the scanning operation after the in-focus position has been detected by the first scanning through the whole scanning range with the movable mirror of the conventional range finder directed against the object.

However, since the motion of the movable mirror for the scanning through the whole range is only a little one, the effect of the error in object distance detection between the going and returning scanning motions of the movable mirror is amplified with respect to the determination of the in-focus position of the photographic lense, therefore, the error in scanning cannot be ignored.

SUMMARY OF THE INVENTION

Accordingly, an object of the present invention is to provide a focus detecting device having a reduced error in the reciprocating scanning operation.

An automatic focusing camera according to the present invention which is capable of detecting the object distance and automatically focusing the photographic lens, is provided with an operating member applied to focus detection, an actuating member rotatably fitted on the operating member, a detecting member actuated against a spring by the actuating member, a signal element which produces an electric signal corresponding to the position of the detecting member, a focus scanning member which performs focus position scanning synchronously with the operation of the detecting member, and an electromagnet controlled by an automatic focus detecting electronic module to adjust the photographic lens to an in-focus position. The operating member makes the actuating member actuate the detecting member. An electric signal given by the signal element is input to the automatic focus detecting module synchronously with the scanning operation of the scanning member. The operating member retracts from the operating area of the detecting member to allow the detecting member to be restored to its original position by a spring after the scanning member has completed the scanning operation through the whole scanning range. The automatic focus detecting module controls the electromagnet in proportion to the signal produced by the signal element so as to fix the photographic lens at the in-focus position during the return motion of the detecting member.

Furthermore, constraining means are provided for the actuating member to constrain the actuating member so as to strain the spring of the detecting member, and which constraining means are adapted so as to be cancelled after the detecting member has completed its operation through the whole scanning range.

Still further, the constraining means comprises a spring, the strength of which is greater than the strength of the spring of the detecting member.

Detailed explanation will be made of the preferred embodiments according to the present invention referring to attached drawings.

Figure 1:
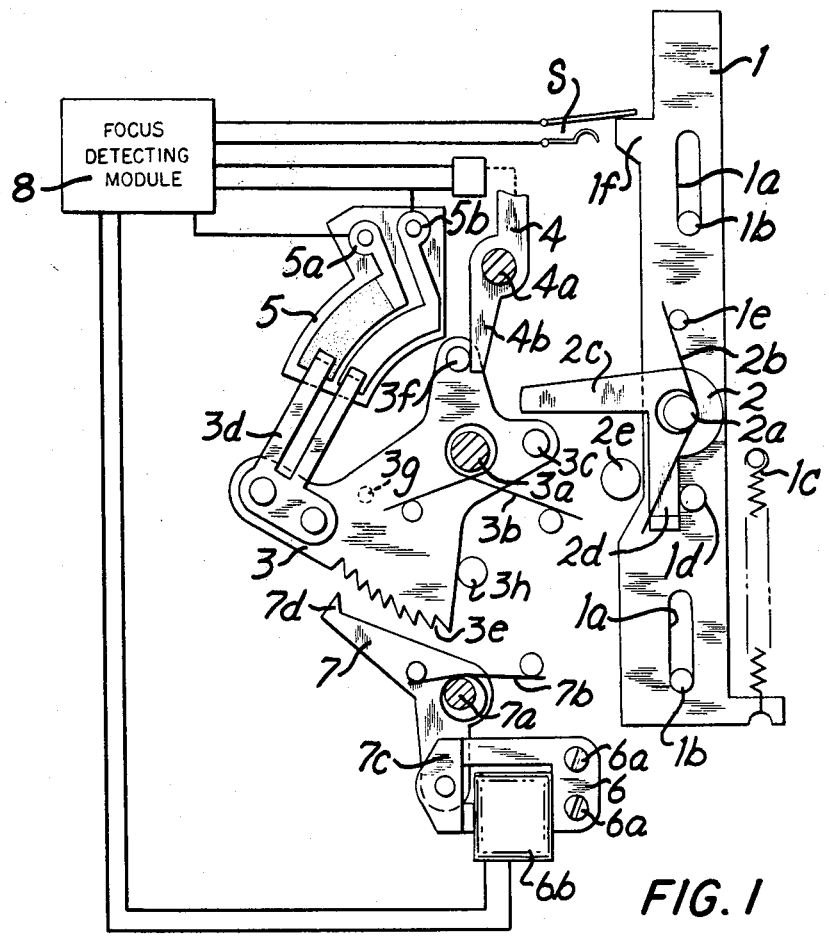
FIG. 1 is a schematic plan view of a first embodiment of the invention.

Referring first to FIG. 1, an operating member (1) having slots (1a), a pin (1d), a spring stop pin (1e) and a protrusion (1f), is slidably guided by pins (1b) fitting in the slots (1a) and is urged upwards by a spring (1c).

An actuating member (2) having an actuating arm (2c) and a stopping arm (2d) is rotatably mounted on the operating member (1) by a shaft (2a) and is urged counterclockwise by a spring (2b). The actuating member (2) normally rests with the stopping arm (2d) in contact with the pin (1d). A pin (2e) projects within the operating range of the root of the actuating arm (2c).

A detecting member (3) having a pin (3c) to be engaged with the actuating arm (2c), a contact plate (3d), ratchet teeth (3e), an upwardly extending pin (3f) and a downwardly extending pin (3g), is rotatably supported by a shaft (3a) and is urged counterclockwise by a spring (3b). The detecting member (3) normally rests with its bottom edge in contact with a fixed pin (3h).

A focus scanning member (4) having an arm (4b) to be engaged with the pin (3f) is rotatably supported by a shaft (4a) and is connected with the movable mirror of a range finder, not shown.

A signal element (5) comprises, for instance, a resistor which slidably receives the contact plate (3d) producing an electric signal corresponding to the position of the contact plate (3d) relative to the resistor at terminals (5a) and (5b).

An electromagnet (6) is fixed on the base plate by means of screws (6a) and is magnetized when exciting current flows through a coil (6b).

An armature lever (7) having an armature (7c) disposed to be attracted by the electromagnet (6) and a detent (7d) to be engaged with the ratchet teeth (3e) is rotatably supported by a shaft (7a) and is urged clockwise by a spring (7b). In the charged state as shown in FIG. 1, the armature (7c) is pushed against the electromagnet (6) by a known means, not shown.

An automatic focus detecting module (8) is actuated when the protrusion (1f) of the operating member (1) closes the switch (S) and controls the electric current for the exciting coil (6b) according to the input signal given by the signal element (5).

The manner of operation of the device will be explained hereinafter. Starting from the charged state as shown in FIG. 1, when the operating member (1) is depressed against the spring (1c) first to perform focus detection, the protrusion (1f) closes the switch (S) to actuate the automatic focus detecting module (8) so that electric current flows through the exciting coil (6b) and the electromagnet (6) attracts the armature (7c).

As the operating member (1) is depressed further, the pushing on the armture lever (7) by the spring (7b) is cancelled and the armature lever (7) is held attracted by the electromagnet (6) while the spring (7b) is applying force to the armature lever (7).

As the operating member (1) is depressed still further, the actuating member (2) pushes the pin (3c) with the actuating arm (2c) so that the detecting member (3) is turned clockwise about the shaft (3a) against the spring (3b) and after the root of the actuating arm (2c) has come in contact with the pin (2e), the actuating member (2) is turned clockwise against the spring (2b) about the shaft (2a) and finally, the actuating arm (2c) is retracted from the operating range of the pin (3c).

During clockwise turning of the detecting member (3), electric signals given by the signal element (5) are sent to the automatic focus detecting module (8) succesively through the contact plate (3d). And at the same time, electric signals are obtained by the scanning operation of the movable mirror of the range finder, not shown, caused by the focus scanning member (4) actuated by the upward pin (3f) in proportion to the clockwise turning of the detecting member (3). The automatic focus detecting module (8) is switched over from the focus detection connection to the in-focus control connection after the detecting member (3) has completed scanning over the whole range by the clockwise turning.

Then, when the actuation of the actuating arm (2c) on the pin (3c) is cancelled, the detecting member (3) is allowed to be turned counterclockwise by the spring (3b) about the shaft (3a). During this counterclockwise turning, electric signals given by the signal element (5) are sent to the automatic focus detecting module (8) through the contact plate (3d). When the focus detecting member (3) turns to the position where the electric signal given by the signal element (5) coincides with the signal level corresponding to the in-focus position which has previously been determined during clockwise turning of the detecting member (3), the automatic focus detecting module (8) cuts off the electric current to the exciting coil (6b).

The electromagnet (6) is demagnetized when the electric current to the exciting coil (6b) is cut off, then the magnetic attraction of the armature (7c) is cancelled, consequently, the armature lever (7) is allowed to be turned clockwise about the shaft (7a) by the spring (7b) and the detent (7d) engages with a tooth of the ratchet (3e) to stop the detecting member at the in-focus position.

In this state with the detecting member retained at the in-focus position, when the photographic lense is shifted, the photographic lens is automatically adjusted to the in-focus position by the downward pin (3g).

When the depression on the operating member (1) is cancelled after the exposure has been completed, the operating member (1) is returned to the charged position as shown by the drawing pulled by the spring (1c) and the protrusion (1f) opens the switch (S), the armature lever (7) is turned counterclockwise against the spring (7b) so that the detent (7d) and the ratchet (3e) are disengaged, then the detecting member (3) and the armature lever (7) return to the original position as shown in the drawing.

Figure 2:
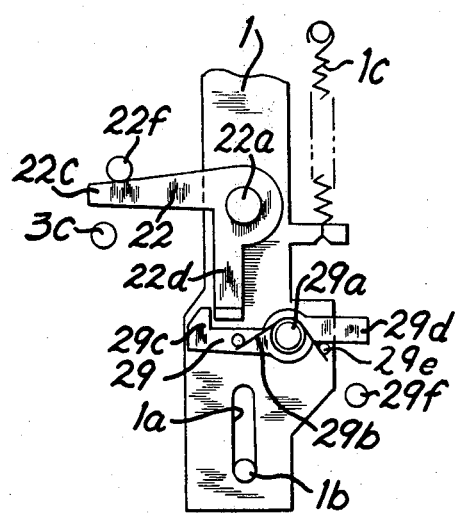
FIG. 2 is a partial schematic plan view of a second embodiment of the invention.

Referring to FIG. 2, like parts as in FIG. 1 are indicated by like reference numerals and explanation of those parts will be omitted to avoid duplication. An actuating member (22) having an actuating arm (22c) and a stopping arm (22d) is rotatably mounted on an operating member (1) by a shaft (22a). The actuating arm (22c) rests on a fixed pin (22f).

A detainer (29) having a hooked part (29c) to be engaged with the stopping arm (22d) and a stopping arm (29d) is rotatably mounted on the operating member (1) by a shaft (29a) and is urged clockwise by a spring (29b). The stopping arm (29d) rests on a pin (29e) fixed on the operating member (1). A pin (29f) is fixedly provided within the moving range of the stopping arm (29d).

In operation, similarly to the operation of the first embodiment, when the operating member is depressed, the actuating arm (22c) of the actuating member (22) engages with the pin (3c) to actuate the detecting member (3) in the manner as explained hereinbefore. The actuating member (22) is turned clockwise about the shaft (22a) at the initial stage of engagement of the actuating arm (22c) with the pin (3c) about the shaft (22a) until it is constrained at the stopping arm (22d) by the hooked part (29c). Simultaneously with completion of clockwise turning of the detecting member (3), the stopping arm (29d) comes in contact with the pin (29f) so that the detainer (29) is turned counterclockwise about the shaft (29a) as the operating member moves downwards so that the retention on the stopping arm (22d) by the hooked part (29c) is cancelled. Consequently, the actuating arm (22c) escapes from the pin (3c). A series of successive operations of the members is identical with that explained according to the first embodiment.

When the operating member (1) returns upwards after the exposure has been completed, the actuating arm (22c) comes in contact with the pin (22f) again so that the actuating member (22) is forced to turn counterclockwise about the shaft (22a) until the actuating member (22) is retained at the stopping arm (22d) by the hooked part (29c) as shown in FIG. 2.

Figure 3:
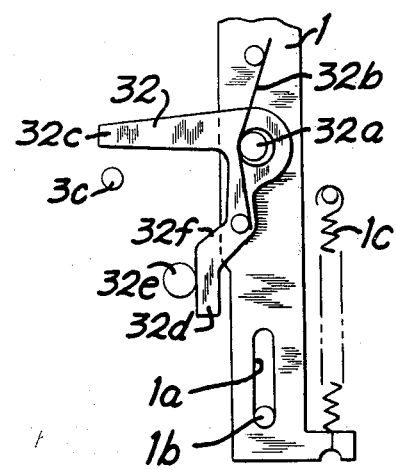
FIG. 3 is a partial schematic plan view of a third embodiment of the invention.

In FIG. 3, like parts as in FIG. 1 are indicated by like reference numerals and explanation of those parts will be omitted to avoid duplication.

Referring to FIG. 3, an actuating member (32) having an actuating arm (32c), a stopping arm (32d) and a recessed part (32f) is rotatably fitted on the operating member (1) by a shaft (32a) and is urged clockwise by a spring (32b). The stopping arm (32d) rests on a fixed pin (32e).

In operation, similarly to the operation of the first embodiment, when the operating member (1) is depressed starting from the state as shown in FIG. 3, the actuating arm (32c) pushes the pin (3c) to actuate the detecting member (3) as the actuating member (32) is constrained so as not to turn about the shaft (32a) by the fixed pin (32e) at the stopping arm (32d). Simultaneously with the completion of the turning of the detecting member (3) through the whole scanning range, the recessed part (32f) reaches opposite the fixed pin (32e) so that the actuating member (32) is allowed to turn clockwise about the shaft (32a) and the actuating arm (32c) retracts from the operating range of the pin (3c), consequently, the detecting member (3) becomes possible to be turned counterclockwise by the spring (3b). A series of successive operations of the members is identical with that explained according to the first embodiment.

When the operating member (1) returns upwards after the exposure has been completed, the actuating member (32) is turned counterclockwise against the spring (32b) as the fixed pin (32e) pushes the actuating member (32) along the edge of the recessed part (32f), and finally, the actuating member (32) is restored to the original position as shown in FIG. 3.

It may be well understood from what has been described hereinbefore that according to the present invention, errors in signal are reduced as in-focus position is adjusted while the detecting member moves along the same course during the focus position control, and furthermore, the errors are reduces still lower because the signals given by such member as the movable mirror which performs a limited motion are picked up during one way of the reciprocating motion of the member, but not during the both ways of the reciprocating motion.

Furthermore, once the photographic lens is focused, this in-focus position is maintained if the operating member (1) is returned a little before the exposure operation except when the engagement of the detent (7d) of the armature lever (7) with the ratchet (3e) is cancelled because the actuating member (2, 22 or 32) actuates the detecting member (3) only during its downward movement, accordingly, the focused object is possible to be disposed optionally in composing a picture.

Still further, every setting is possible to be cancelled by restoring the operating member (1) to its original position, and the mechanism according to the invention is possible to be applied to a range finder by providing a means for indicating the phase of the detecting member (3).

Although the focus scanning member (4) is adapted to be actuated by the detecting member (3) in the preferred embodiments, in a modified embodiment, the focus scanning member (4) may be adapted to be actuated by the operating member (1). The member which is controlled by the armature lever (7) is not limited to the detecting member (3), but the members actuated in connection with the operation of the operating member (1) or the photographic lens supporting members may be adapted to be controlled by the armature lever (7).

Regarding the operation of the operating member (1), the operating member (1) is depressed against the spring (2c) as described concerning the preferred embodiments, however, in a modification the operating member (1) may be contrained against a spring at the charged position so as to perform a series of operation as described above when the restraint is cancelled corresponding to shutter release operation.

Thus, according to the present invention, more accurate automatic focusing is possible only by means of a simple mechanism.

We claim:

1. An automatic focusing apparatus for use in a camera, comprising: an operating member movable from a rest position to a depressed position; an actuating member rotatably mounted on the operating member; a detecting member mounted for movement from a first position to a second position and means biasing same into the first position; means acting on the actuating member for enabling the actuating member to move the detecting member from the first to the second position in response to the movement of the operating member from the rest position to the depressed position and for disengaging the actuating member from the detecting member when the operating member is in the depressed position to enable the detecting member to move from the second position to the first position by the action of the biasing means; a device for producing an electrical signal corresponding to the position of the detecting member; a focus scanning member movable over its entire focus scanning range in response to the movement of the detecting member from its first to its second positions; electromagnetic means responsive to the actuation thereof for stopping the movement of the detecting member during the movement thereof from the second position to the first position; and a focus detecting module receptive of the signal from said device synchronously with the movement of the focus scanning member during the movement of the detecting member to the second position to determine the signal from said device corresponding to the in-focus position and for actuating the electromagnetic means to stop the return movement of the detecting member to its first position when the signal from said device is equal to that determined for the in-focus position.

2. An automatic focusing camera as set forth in claim 1 wherein the means acting on the actuating member comprises constraining means for constraining said actuating member to move said detecting member against the biasing means, and means for releasing the constraining means when the operating member is in the depressed position.

3. An automatic focusing camera as set forth in claim 2 wherein said constraining means comprises a spring, the strength of which is greater than the strength of the means biasing said detecting member.

4. The apparatus according to claim 1, wherein the means acting on the actuating member moves same out of the operating range of the detecting member when the operating member is in the depressed position.

* * * * *